US009521506B2

(12) United States Patent
Cazoulat et al.

(10) Patent No.: US 9,521,506 B2
(45) Date of Patent: Dec. 13, 2016

(54) METHOD FOR USE IN A FIRST DEVICE TO MANAGE WRITING AN ANSWER TO A MESSAGE RECEIVED FROM A SECOND DEVICE

(71) Applicant: Orange, Paris (FR)

(72) Inventors: Renaud Cazoulat, Saint Gregoire (FR); Sebastien Brault, Pleumeur-Bodou (FR); Erwan Morvillez, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/452,202

(22) Filed: Aug. 5, 2014

(65) Prior Publication Data
US 2015/0038132 A1  Feb. 5, 2015

(30) Foreign Application Priority Data

Aug. 5, 2013  (FR) ...................... 13 57784

(51) Int. Cl.
*H04W 4/00* (2009.01)
*H04L 12/58* (2006.01)
*H04W 4/14* (2009.01)

(52) U.S. Cl.
CPC ............. *H04W 4/008* (2013.01); *H04L 51/02* (2013.01); *H04L 51/24* (2013.01); *H04W 4/14* (2013.01)

(58) Field of Classification Search
CPC ........ H04W 4/0008; H04W 4/14; H04W 4/12; H04W 4/20; H04L 51/02
See application file for complete search history.

(56) References Cited

U.S. PATENT DOCUMENTS

| | | | |
|---|---|---|---|
| 2012/0094637 A1 | 4/2012 | Jeyaseelan et al. | |
| 2012/0165047 A1* | 6/2012 | Dolenc | 455/466 |
| 2012/0290664 A1 | 11/2012 | Ahmed et al. | |
| 2013/0316746 A1* | 11/2013 | Miller et al. | 455/466 |

FOREIGN PATENT DOCUMENTS

WO  2008030702 A2  3/2008

OTHER PUBLICATIONS

French Search Report and Written Opinion dated May 16, 2014 for corresponding French Application No. FR 1357784, filed Aug. 5, 2013.
English translation of the French Written Opinion dated Nov. 27, 2015 for corresponding French Patent Application No. 1357784, filed Aug. 5, 2013.

* cited by examiner

*Primary Examiner* — Curtis Odom
(74) *Attorney, Agent, or Firm* — David D. Brush; Westman, Champlin & Koehler, P.A.

(57) ABSTRACT

A method is provided for use in a first device for managing writing an answer after receiving a message coming from a second device. At least one possible answer to the message is received by the first device from the second device for selection.

5 Claims, 2 Drawing Sheets

METHOD FOR USE IN A FIRST DEVICE TO MANAGE WRITING AN ANSWER TO A MESSAGE RECEIVED FROM A SECOND DEVICE

TECHNICAL FIELD

The invention relates to a method for use in a first device to manage writing an answer to a message received from a second device.

The first device relates more particularly to a device having physical and software resources that are such that writing a message is difficult if not impossible. This applies for example when the device does not have a keypad enabling characters to be input.

The second device relates more particularly to a device capable of communicating both with the first device via a first communications channel and with other devices via at least one other communications channel.

In the description below, a first device is represented by means of a connected watch, and a second device is represented by means of a smartphone.

A communications channel covers both a wireless communications network of the WiFi, 3G, etc. type, and/or a wired connection of the universal serial bus (USB) type.

In this example, the selected first channel is a (wireless) Bluetooth network. The second channel is an Internet type network.

STATE OF THE ART

A connected watch may be connected to a smartphone via a communications network. In this configuration, the smartphone may send notifications to the watch, such as, for example:

a notification about receiving a telephone message;
a notification about receiving a short message of the short message service (SMS) type;
etc.

The smartphone communicates with the watch via a communications network such as the Bluetooth network. The Bluetooth standard serves to transmit certain notifications to the watch (typically SMS, emails, calls), but it does not enable them to be answered.

Consequently, the user is obliged to use the smartphone in order to answer. The user thus loses the benefit of the discretion provided by a connected watch, in particular, when the smartphone is not easily accessible, e.g. because it is in the user's pocket or handbag.

The invention provides a solution that does not present the drawbacks of the state of the art.

SUMMARY

To this end, in a functional aspect, the invention provides a method for use in a first device to manage writing an answer after receiving a request sent from a second device, the method being characterized in that at least one possible answer to the message is received for selection by the first device.

By means of the invention, the first device no longer needs to manage actually writing the answer. The possible answer(s) is/are provided by the second device to the first device. With the first device it suffices merely to select an answer and then transmit that answer to the second device, which in turn handles processing of the answer, e.g. by transmitting it over the network to a third device involved with the answer.

In this way, the user can receive notifications and can answer those notifications directly from the second device and can do so simply, since the step of creating the answer is reduced to no more than selecting one answer from at least one proposed answer. The user therefore no longer has any need to use the smartphone for answering.

The intended request may relate to a software application from among a plurality of applications. In a particular implementation of the invention, said at least one possible answer is a function of the application. The second device is provided for this purpose with a selection module suitable for selecting a set of possible answers for transmission to the first device; the selection is made on the basis of the intended application. By way of example, the set of answers in question may be previously defined by the user.

By way of example, the application may be a telephony application. Thus, in a particular implementation of the invention, which may be performed as an alternative to or as well as the preceding implementation, said at least one possible answer is a function of the caller. For example, the second device may have a list of contacts who might call that second device; and the user can configure the possible answers as a function of the users in the list. Thereafter, depending on the caller, the second device transmits to the first device all of the possible answers that have been defined during the above-mentioned configuration. In this way, the list of possible answers is not frozen but varies as a function of the application or indeed as a function of the caller when the application is a telephony application.

In another functional aspect, the invention provides a method for use in a device referred to as a second device to manage sending a first message via a first communications channel to a first device, the second device having previously received a second message over a second communications channel, the method being characterized in that the first message includes at least one possible answer that can be selected.

In a hardware aspect, the invention provides a device referred to as a first device, including a receive module for receiving a message from a second device, the first device being characterized in that the receive module is suitable also for receiving at least one possible answer to said message, and in that it includes a module for selecting a message.

In another hardware application, the invention provides a device referred to as a second device, including a management module for managing sending a first message via a first communications channel to a first device, the second device having previously received a second message from a second communications channel, the second device being characterized in that the first message includes at least one possible answer that can be selected.

In another hardware application, the invention provide a first computer program suitable for being performed on the first above-defined device, the program including code instructions that, when the first program is executed by a processor, perform the management method executed by the first device as defined above and in claim 1.

In another hardware aspect, the invention provides a data medium readable by a data processor and having recorded thereon a program including program code instructions for executing the management method executed by the first device as defined above and in claim 1.

In another hardware aspect, the invention provides a computer program suitable for being performed by the second above-defined device, the program including code instructions that, when the program is executed by a processor, perform the management method executed in the second device as defined above and in claim 4.

In another hardware aspect, the invention provides a data medium readable by a data processor and having stored thereon a program including program code instructions for executing the management method when executed by the second device as defined above and in claim 4.

BRIEF DESCRIPTION OF THE DRAWINGS

The invention can be better understood on reading the following description given by way of example and made with reference to the accompanying drawings, in which.

DETAILED DESCRIPTION OF AN IMPLEMENTATION ILLUSTRATING THE INVENTION

Figure 1:
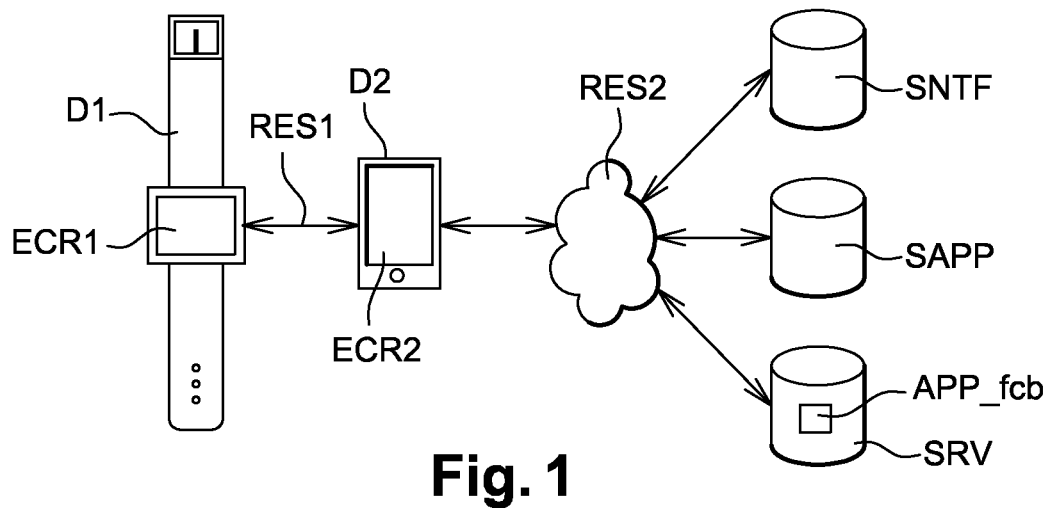
FIG. 1 shows an embodiment of a computer system in which the invention can be performed.
Figure 2:
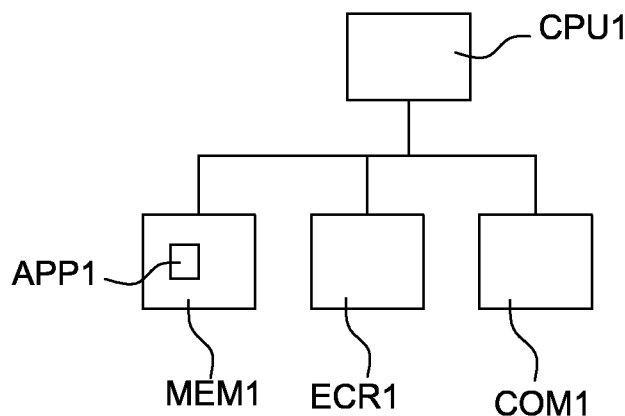
FIGS. 2 and 3 are diagrammatic views of the structure of the first device and of the second device, respectively.
Figure 3:
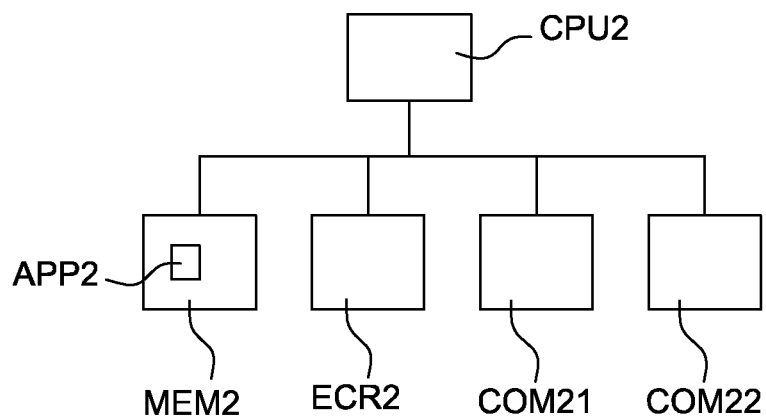

FIG. 1 shows a system SYS comprising a first device D1 represented by means of a watch. The first device in this example is a connected watch including a computer environment enabling a first application APP1 to be executed, with its operation being explained below in this description.

The watch includes the following modules, amongst others:
- a selection module MSEL enabling a text on the screen to be selected;
- a display module ECR1 represented by a screen; and
- a communications module COM1 for communicating, in particular with a smartphone.

It should be observed that in this example the first device could equally well be connected eyeglasses or any other communicating article.

The system also has a second device D2 represented by a smartphone and suitable for communicating with the first device via a first communications channel represented by means of a communications network RES1; in this example, this first network is a Bluetooth network. Some other second network could equally well be used instead of the Bluetooth network, such as for example a wired connection, e.g. a USB cable.

In this example, the smartphone may also communicate with a notifications server via a second communications channel, represented by means of a communications network RES2. For this purpose, the smartphone comprises the following modules amongst others:
- a memory module MEM2 in which a second application APP2 is stored;
- a display module ECR2 represented by means of a screen;
- a first communications module COM21 for communicating with the watch D1 via the first network RES1; and
- a second communications module COM22 for communicating with the second network RES2.

In this example, the second network is an Internet network.

It should be recalled at this point that the first and second networks may be any network; any communications channels other than those used herein to represent the invention could equally well have been used.

The system further comprises a notifications server SNTF. The notifications server aggregates a plurality of messages having a variety of diverse origins. A particular function of this server is to receive notifications and to process the notifications in order to transmit a message to the smartphone.

The notifications in question may be of any origin. For example, a notification may come from any of the following sources:
- an email server;
- a server dedicated to telephony, enabling a telephone call to be set up, or short messages to be exchanged;
- a Facebook (registered trademark) type communications application;
- a calendar type application;
- a weather application;
- etc.

In this implementation, the system SYS also has an application server SAPP for sending SMS short messages. This server for sending SMS messages communicates with the above-described notification server.

Figure 4:
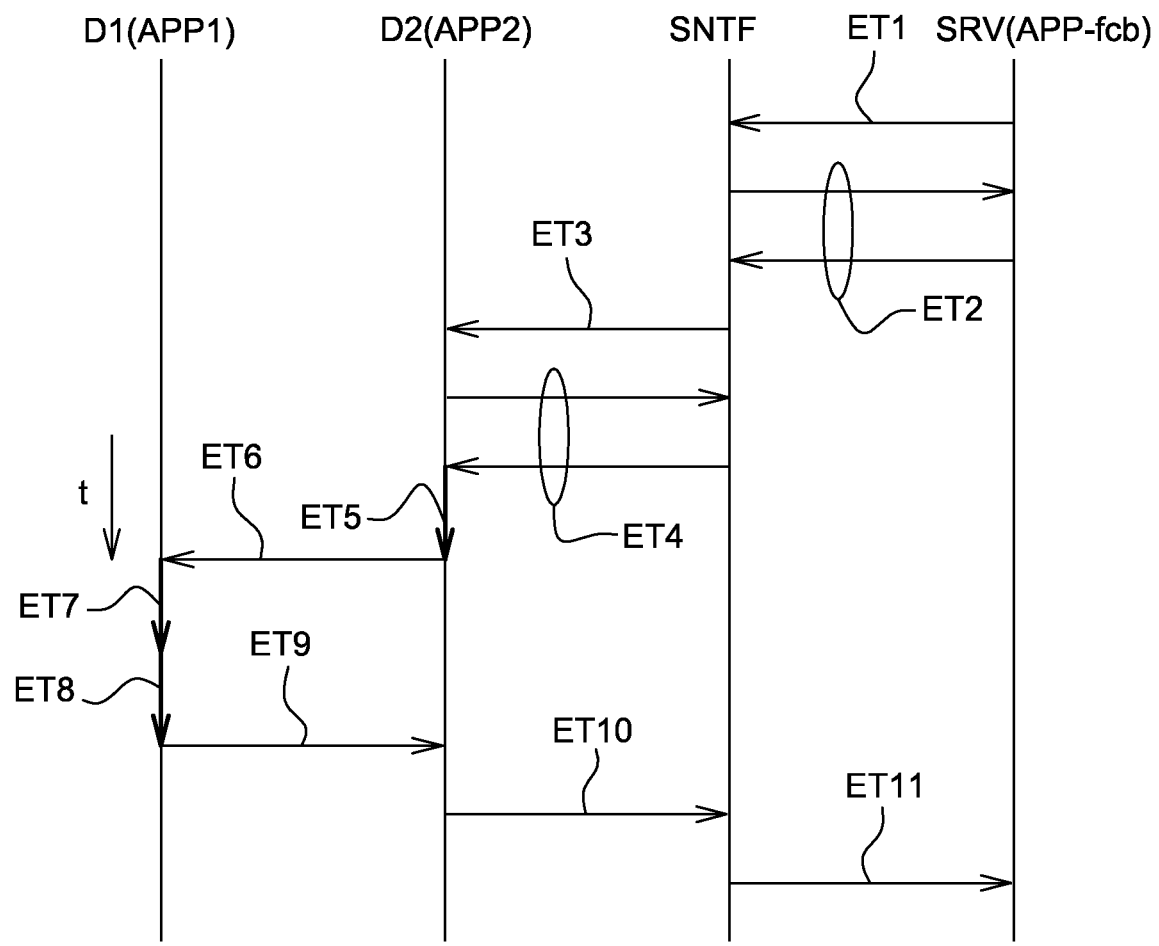
FIG. 4 is a diagrammatic view of message exchanges in an implementation described with reference to FIG. 1.

FIG. 4 is a diagrammatic view of message exchanges representing an implementation of the method of the invention. The method comprises a plurality of steps referenced ET1 to ET11.

During a first step ET1, a communications application APP-fcb, e.g. a Facebook application, hosted on a server SRV sends a notification indicating that a message MSG has been received on the account of the user UT.

During a second step ET2, the notification server SNTF recovers the data relating to the received message MSG. By way of example, the message comprises a text and an image. By way of example, the image is in the format of the joint photographic experts group (JPEG).

During a third step ET3, the notification server SNTF sends a notification to the second application APP2 present on the second device, namely the smartphone D2.

During a fourth step ET4, the second application APP2 recovers the message from the notification server SNTF.

In a variant, the server could send both the notification and the message, thereby avoiding any need for the second application to recover the message on the server SNTF.

During an optional fifth step ET5, the second application modifies the image so that it is in a format compatible with the physical and software resources present on the first terminal.

During a sixth step ET6, the second application transmits the message, the modified image, and at least one possible reply, e.g. "like", or "great", or "dislike" to the first application.

By way of example, the message format is as follows:
{MessageID: ""FB:12453674992"
Caption: "I am an FB post"
Image: "encoded image"
Answers: [
{type: "FB like" caption: "like"}
{type: "FB comment" caption: "great"}

During a seventh step ET7, the first application APP1 receives the message from the second application and interprets it by displaying the text corresponding the attribute "caption", namely "I am an FB post". The first application also interprets the received image and displays it as well on the first screen ECR1.

The first application APP1 also displays the list of possible answers. In this example, the first application requires two proposed answers to be displayed, namely:
like
great During an eighth step ET8, the user selects the desired answer, e.g. "like".

During a ninth step ET9, the first application APP1 transmits the selected answer to the second application APP2.

During a tenth step ET10, the second application APP2 receives the answer and performs a predefined action.

By way of example, the predefined action may be:
setting up a telephone call; or
sending a message to the notification server, the message including for example:
the selected answer "like" so that this answer is published in the application APP-fcb: and
the identifier MessageID, i.e. FB:12453674992.

If the action is ending a message to a notification server, then during an eleventh step ET11, the application APP-fcb receives the message and publishes it.
{MessageID: ""FB:12453674992"
answers: {type: "FB like" caption: "like"}

It is specified at this point that a predefined message may for example be a predefined comment or a predefined answer.

The possible answers may vary. For example, the request may be associated with a given application. In this configuration, the possible answer(s) is/are a function of the application.

By way of example, the application may be a telephony application. A telephone call implies that there is a calling device and a called device; in this example, the called device is the second device D2. In this configuration, the second device D2 may have a list of contacts that might call the second device. In this example, the list of possible answers may for example be a function of the caller.

For a first caller, e.g. corresponding to a first contact in the list, the list of answers may be as follows:
"I am in a meeting"
"I'll call you back in 10 min"

For a second caller, e.g. corresponding to a second contact in the list, the answers that might be selected may be as follows:
"I'm not available"
"please call back later"
"I'll call you"

The possible answers may also vary as a function of the time of day.

It should be specified that the term "module" used in the present application may correspond equally well to a software component or to a hardware component or to a combination of hardware and software components, a software component itself comprising one or more computer programs or subprograms or more generally any program element suitable for performing a function or a set of functions as described for the modules in question. In the same way, a hardware component may correspond to any element of a hardware assembly suitable for performing a function or a set of functions for the module in question (integrated circuit, smart card, memory card, etc.).

Although the present disclosure has been described with reference to one or more examples, workers skilled in the art will recognize that changes may be made in form and detail without departing from the scope of the disclosure and/or the appended claims.

The invention claimed is:

1. A method comprising, in a second device:
receiving a second message from a source device on second communication channel, said second message involving a response;
sending a first message derived from the second message to a first device on a first communication channel, the first message adding at least one possible answer for response to the second message;
receiving a response from the first device, selected among the at least one possible answer; and
transmitting said selected response to the source through the second communication channel.

2. A method according to claim 1, wherein the first message relates to a given application, and said at least one possible answer is a function of the application.

3. A method according to claim 2, wherein the application is a telephony application, and said at least one possible answer is a function of a caller.

4. A device referred to as a second device, including:
a hardware data medium storing instructions;
a processor, which is configured by the instructions to perform the following acts:
receiving a second message from a source device on a second communication channel, said second message involving a response;
sending a first message derived from the second message to a first device on a first communication channel, the first message adding at least one possible answer for response to the second message;
receiving a response from the first device, selected among the at least one possible answer; and
transmitting said selected response to the source through the second communication channel.

5. A hardware data medium comprising a computer program stored thereon, the program including code instructions that, when the program is executed by a processor, perform a method comprising:
receiving a second message from a source device on a second communication channel said second message involving a response;
sending a first message derived from the second message to a first device on a first communication channel, the first message adding at least one possible answer for response to the second message;
receiving a response from the first device, selected among the at least one possible answer; and
transmitting said selected response to the source through the second communication channel.

* * * * *